United States Patent
Kenkre et al.

(10) Patent No.: US 9,922,305 B2
(45) Date of Patent: *Mar. 20, 2018

(54) COMPENSATING FOR REDUCED AVAILABILITY OF A DISRUPTED PROJECT RESOURCE

(71) Applicant: International Business Machines Corporation, Armonk, NY (US)

(72) Inventors: Sreyash D. Kenkre, Bangalore (IN); Sameep Mehta, New Delhi (IN); Krishnasuri Narayanam, Bangalore (IN); Vinayaka D. Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/161,412

(22) Filed: May 23, 2016

(65) Prior Publication Data

US 2016/0267415 A1    Sep. 15, 2016

Related U.S. Application Data

(63) Continuation of application No. 14/249,782, filed on Apr. 10, 2014, now Pat. No. 9,400,970, which is a
(Continued)

(51) Int. Cl.
*G06F 9/46* (2006.01)
*G06Q 10/08* (2012.01)
*G06Q 10/06* (2012.01)

(52) U.S. Cl.
CPC ..... *G06Q 10/087* (2013.01); *G06Q 10/06313* (2013.01)

(58) Field of Classification Search
None
See application file for complete search history.

(56) References Cited

U.S. PATENT DOCUMENTS 5,276,876 A    1/1994   Coleman et al.
6,078,912 A    6/2000   Buerger et al.
(Continued)

OTHER PUBLICATIONS

Notice of Allowance (dated Jul. 15, 2016) for U.S. Appl. No. 14/250,684, filed Apr. 11, 2014.
(Continued)

*Primary Examiner* — Kenneth Tang
(74) *Attorney, Agent, or Firm* — Schmeiser, Olsen & Watts, LLP; John Pivnichny

(57) ABSTRACT

A method and associated systems for automatically identifying critical resources in an organization. An organization creates a model of the dependencies between pairs of resource types, wherein that model describes how the organization's projects and services are affected when a resource type becomes unavailable. This model may include a system of directed graphs. This model may be used to automatically identify a resource type as critical if unacceptable cost is incurred by resuming projects and services rendered infeasible when the resource type is disrupted. The model may also be used to automatically identify a first resource type as critical for a second resource type when disruption of the first resource type forces the available capacity of the second resource type to fall below a threshold value.

20 Claims, 3 Drawing Sheets

Related U.S. Application Data continuation of application No. 13/483,492, filed on May 30, 2012, now Pat. No. 8,843,936.

(56) References Cited

U.S. PATENT DOCUMENTS

| | | | |
|---|---|---|---|
| 6,094,680 A | 7/2000 | Hokanson | |
| 6,219,654 B1 | 4/2001 | Ruffin | |
| 6,292,905 B1 | 9/2001 | Wallach et al. | |
| 6,965,867 B1 | 11/2005 | Jameson | |
| 7,146,353 B2 | 12/2006 | Garg et al. | |
| 7,171,668 B2 | 1/2007 | Molloy et al. | |
| 7,313,531 B2* | 12/2007 | Chappel | G06Q 10/06 705/7.17 |
| 7,330,822 B1* | 2/2008 | Robson | G06Q 10/06 705/7.15 |
| 7,444,635 B2 | 10/2008 | Lehtinen | |
| 7,469,216 B2* | 12/2008 | Kumhyr | G06Q 10/02 705/26.1 |
| 7,516,455 B2 | 4/2009 | Matheson et al. | |
| 7,827,557 B2 | 11/2010 | Zhu et al. | |
| 7,979,298 B2 | 7/2011 | Cheng et al. | |
| 8,078,664 B2 | 12/2011 | Radia et al. | |
| 8,117,505 B2 | 2/2012 | Sridharan et al. | |
| 8,185,905 B2 | 5/2012 | Cook | |
| 8,249,906 B2* | 8/2012 | Ponce de Leon | G06Q 10/06 705/28 |
| 8,438,211 B2 | 5/2013 | Radia et al. | |
| 8,495,646 B2 | 7/2013 | Uchida | |
| 8,554,586 B2* | 10/2013 | Barth | G06Q 10/00 235/114 |
| 8,661,447 B1 | 2/2014 | Olliff et al. | |
| 8,676,622 B1 | 3/2014 | Ward et al. | |
| 8,843,936 B2 | 9/2014 | Kenkre et al. | |
| 8,924,269 B2* | 12/2014 | Seubert | G06Q 10/06 705/35 |
| 9,400,970 B2* | 7/2016 | Kenkre | G06Q 10/06313 |
| 2003/0191678 A1 | 10/2003 | Shetty et al. | |
| 2004/0064436 A1 | 5/2004 | Breslin et al. | |
| 2005/0144062 A1 | 6/2005 | Mittal et al. | |
| 2005/0165633 A1 | 7/2005 | Huber | |
| 2005/0240795 A1 | 10/2005 | Paller et al. | |
| 2007/0208799 A1 | 9/2007 | Hughes | |
| 2008/0091806 A1 | 4/2008 | Shen et al. | |
| 2009/0063234 A1 | 3/2009 | Refsland et al. | |
| 2009/0327012 A1 | 12/2009 | Sharma et al. | |
| 2010/0318846 A1 | 12/2010 | Sailer et al. | |
| 2010/0333002 A1 | 12/2010 | Karabey et al. | |
| 2013/0204983 A1 | 8/2013 | Kenkre et al. | |
| 2014/0222490 A1 | 8/2014 | Kenkre et al. | |
| 2014/0257907 A1 | 9/2014 | Chen et al. | |

OTHER PUBLICATIONS

Office Action (dated May 12, 2016) for U.S. Appl. No. 14/250,684, filed Apr. 11, 2014.
Amendment (dated Jun. 28, 2016) for U.S. Appl. No. 14/250,684, filed Apr. 11, 2014.
Wold et al.; Risk Analysis Techniques; Disaster Recovery Journal; Retrieved from the Internet: <URL: http://www.drj.com/new2dr/w3_030.htm; retrieved Feb. 1, 2012; 7 pages.
Wallace, Simon; Planning; The ePM Book; Retrieved from the Internet: <URL: http://epmbook.com/planning.htm>; retrieved on Feb. 1, 2012; 19 pages.
Business Resumption and Contingency Planning Procedures; Retrieved from the Internet: <URL: http://www.myfpaa.org/IRM/Policy/IR-DisasterPlanning.htm>; retrieved Feb. 1, 2012; 5 pages.
Caglayan et al.; Activity Sequence Learning in Mission Critical Tasks; 2011 Proceedings of the 14th International Conference on Information Fusion (FUSION); Jul. 5-8, 2011; 8 pages.
Manktelow et al.; Risk Analysis: Evaluating and managing the risks that you face; Retrieved from the Internet: <URL: http://www.mindtools.com;pages/article/newTMC_07.htm>; retrieved on Feb. 1, 2012; 3 pages.
Jutte, Bart; 10 Golden Rules of Project Risk Management; Retrieved from the Internet: <URL: http://www.projectsmart.co.uk/10-golden-rules-of-project-risk-management.html>; retrieved on Feb. 1, 2012; 3 pages.
Business Continuity Planning Procedures and Guidelines; United States Agency International Development; Jun. 1, 2006; 5 pages.
Anonymous; A System and Method for Efficient and Effective Resumption of Organizational Operations during Disruptions; IP.com Prior Art Database Technical Disclosure; Jun. 21, 2011; 5 pages.
Cui et al.; Critical Resources Identification Constant Resource Constrained Projects;2006 IEEE International Conference on Systems, Man and Cybernetics; Oct. 8-11, 2006; 4 pages.
Fu, Song; Failure-Aware Construction and Reconfiguration of Distributed Virtual Machines for High Availability Computing; IEEE/ACM Intl. Symp. on Cluster Computing and the Grid, CCGrid, May 2009; 8 pages.
Verma et al.; CosMig: Modeling the Impact of Reconfiguration in a Cloud; 2011 IEEE 19th Annual International Symposium on Modelling, Analysis, and Simulation of Computer and Telecommunication Systems; Jul. 25-27, 2011; 9 pages.
Business Continuity Planning for Small to Medium-Sized Businesses and the Voluntary Organisations; Shropshire County Council, Emergency Planning Unit; 2008; 24 pages.
Business Continuity Software; Continuity Central; 2012; Retrieved from the Internet: <URL: http://www.continuitycentral.com/bsc.htm>; retrieved on Feb. 16, 2012; 1 page.
Enterprise Cloud Services; Cloud Computing, Disaster Recovery, Online Backup, Colacation—SunGard AS; Retrieved from the Internet: <URL: http://www.sungardas.com/Pages/default.aspx>; retrieved on Feb. 16, 2012; 2 pages.
Business Continuity Plan Solutions; EverGreen Data Continuity, Inc.; Retrieved from the Internet: <URL: http://www.evergreen-data.com/>; retrieved on Feb. 16, 2012; 2 pages.
ErLogix Business Continuity Management System and Disaster Recovery Planning Solution (Home Page); ErLogix; Retrieved from the Internet: <URL: http://www.erlogix.com>; retrieved on Feb. 16, 2012; 2 pages.
Disaster Management Support (DMS) Programme; Indian Space Research Organisation; Retrieved from the Internet: <URL: http://www.isro.org/publications/pdf/DMSBrochure.pdf>; retrieved on Feb. 16, 2012; 4 pages.
ISRO Disaster Management System; 2008; Retrieved from the Internet: <URL: http://www.isro.org/scripts/disastermanagementsystem.aspx>; retrieved on Feb. 20, 2012; 1 page.
Notice of Allowance (dated Mar. 31, 2014), Filing Date May 30, 2012, Conf. No. 6842.
U.S. Appl. No. 14/250,684, filed Apr. 11, 2014, Conf. No. 1080.
Office Action (dated May 17, 2013) for U.S. Appl. No. 13/366,438, filed Feb. 6, 2012, Conf. No. 5697.
Response (filed Jul. 9, 2013) for U.S. Appl. No. 13/366,438, filed Feb. 6, 2012, Conf. No. 5697.
Final Office Action (dated Oct. 9, 2013) for U.S. Appl. No. 13/366,438, filed Feb. 6, 2012, Conf. No. 5697.
Notice of Appeal (filed Mar. 5, 2014) for U.S. Appl. No. 13/366,438, filed Feb. 6, 2012, Conf. No. 5697.
Editor Ken Doughty, Business Continuity Planning (Book), McManus et al., Chapter 1, Risk and the Need for Business Continuity Planning, pp. 3-10, 2001.
Sally Meglathery, Editor Ken Doughty, Business Continuity Planning (Book), Chapter 11, Overview of Business Continuity Planning, pp. 83-84, 2001.
Carl B. Jackson, Editor Ken Doughty, Business Continuity Planning (Book), Chapter 14, The Business Impact Assessment Process, pp. 119-121, 2001.
Notice of Allowance (dated Apr. 25, 2016) for U.S. Appl. No. 14/249,782, filed Apr. 10, 2014, Conf. No. 2837.
Office Action (dated May 12, 2016) for U.S. Appl. No. 14/250,684, filed Apr. 11, 2014, Conf. No. 1080.

* cited by examiner

COMPENSATING FOR REDUCED AVAILABILITY OF A DISRUPTED PROJECT RESOURCE

This application is a continuation application claiming priority to Ser. No. 14/249,782, filed Apr. 10, 2014, now U.S. Pat. No, 9,400,970, issued Jul. 26, 2016, which is a continuation of Ser. No. 13/483,492, filed May 30, 2012, U.S. Pat. No. 8,843,936, issued Sep. 23, 2014.

TECHNICAL FIELD

The present invention relates to automatically identifying critical resources in an organization.

BACKGROUND

Business-continuity planning is the process of ensuring that business functions remain uninterrupted despite the occurrence of natural, man-made, or environmental threats, and may involve building resilient systems that can overcome risks identified during system assessment.

Business-continuity planning may consist of the following steps:

1. Identifying and prioritizing business-critical systems, functions and resources;
2. Identifying critical resources;
3. Identifying potential threats and preventive controls to mitigate risk;
4. Designating responsibilities;
5. Implementing and maintaining a business-continuity plan; and
6. Validating the business-continuity plan.

BRIEF SUMMARY

A first embodiment of the present invention provides a method for automatically identifying critical resources of an organization, wherein said organization comprises a plurality of projects, wherein a project of said plurality of projects comprises a plurality of resource instances, wherein a resource instance of said plurality of resource instances is associated with a resource type of a plurality of resource types, and wherein a disruption of a disrupted resource type of said plurality of resource types results in an unavailability of a unit of a resource instance of said plurality of resource instances, said method comprising:

a processor of a computer system receiving one or more dependency relationships, wherein a dependency relationship of said one or more dependency relationships relates an independent resource type of said plurality of resource types and a dependent resource type of said plurality of resource types, and wherein a first disruption of said independent resource type results in a second disruption of said dependent resource type;

said processor determining a capacity of said dependent resource type, wherein said capacity is a function of an initial disruption of an initially disrupted resource type of said plurality of resource types and wherein said capacity is a further function of said one or more dependency relationships;

said processor categorizing said initially disrupted resource type as being critical for said dependent resource type, wherein said categorizing is a function of said capacity of said dependent resource type.

A second embodiment of the present invention provides a computer program product, comprising a computer-readable hardware storage device having a computer-readable program code stored therein, said computer-readable program code implementing a method for automatically identifying critical resources of an organization, said method implemented by execution of said program code on a processor of a computer system, wherein said organization comprises a plurality of projects, wherein a project of said plurality of projects comprises a plurality of resource instances, wherein a resource instance of said plurality of resource instances is associated with a resource type of a plurality of resource types, and wherein a disruption of a disrupted resource type of said plurality of resource types results in an unavailability of a unit of a resource instance of said plurality of resource instances, said method comprising:

said processor receiving one or more dependency relationships, wherein a dependency relationship of said one or more dependency relationships relates an independent resource type of said plurality of resource types and a dependent resource type of said plurality of resource types, and wherein a first disruption of said independent resource type results in a second disruption of said dependent resource type;

said processor determining a capacity of said dependent resource type, wherein said capacity is a function of an initial disruption of an initially disrupted resource type of said plurality of resource types and wherein said capacity is a further function of said one or more dependency relationships;

said processor categorizing said initially disrupted resource type as being critical for said dependent resource type, wherein said categorizing is a function of said capacity of said dependent resource type.

A third embodiment of the present invention provides a computer system comprising a processor, a memory coupled to the processor, and a computer-readable hardware storage device coupled to said processor, said storage device containing program code configured to be run by the processor via the memory to implement a method for automatically identifying critical resources of an organization, wherein said organization comprises a plurality of projects, wherein a project of said plurality of projects comprises a plurality of resource instances, wherein a resource instance of said plurality of resource instances is associated with a resource type of a plurality of resource types, and wherein a disruption of a disrupted resource type of said plurality of resource types results in an unavailability of a unit of a resource instance of said plurality of resource instances, said method comprising:

said processor receiving one or more dependency relationships, wherein a dependency relationship of said one or more dependency relationships relates an independent resource type of said plurality of resource types and a dependent resource type of said plurality of resource types, and wherein a first disruption of said independent resource type results in a second disruption of said dependent resource type;

said processor determining a capacity of said dependent resource type, wherein said capacity is a function of an initial disruption of an initially disrupted resource type of said plurality of resource types and wherein said capacity is a further function of said one or more dependency relationships;

said processor categorizing said initially disrupted resource type as being critical for said dependent resource type, wherein said categorizing is a function of said capacity of said dependent resource type.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with the computer system is configured to implement a method for automatically identifying critical resources of an organization, said method implemented by execution of said program code on a processor of a computer system, wherein said organization comprises a plurality of projects, wherein a project of said plurality of projects comprises a plurality of resource instances, wherein a resource instance of said plurality of resource instances is associated with a resource type of a plurality of resource types, and wherein a disruption of a disrupted resource type of said plurality of resource types results in an unavailability of a unit of a resource instance of said plurality of resource instances, said method comprising:

said processor receiving one or more dependency relationships, wherein a dependency relationship of said one or more dependency relationships relates an independent resource type of said plurality of resource types and a dependent resource type of said plurality of resource types, and wherein a first disruption of said independent resource type results in a second disruption of said dependent resource type;

said processor determining a capacity of said dependent resource type, wherein said capacity is a function of an initial disruption of an initially disrupted resource type of said plurality of resource types and wherein said capacity is a further function of said one or more dependency relationships;

said processor categorizing said initially disrupted resource type as being critical for said dependent resource type, wherein said categorizing is a function of said capacity of said dependent resource type.

DETAILED DESCRIPTION

Figure 1:
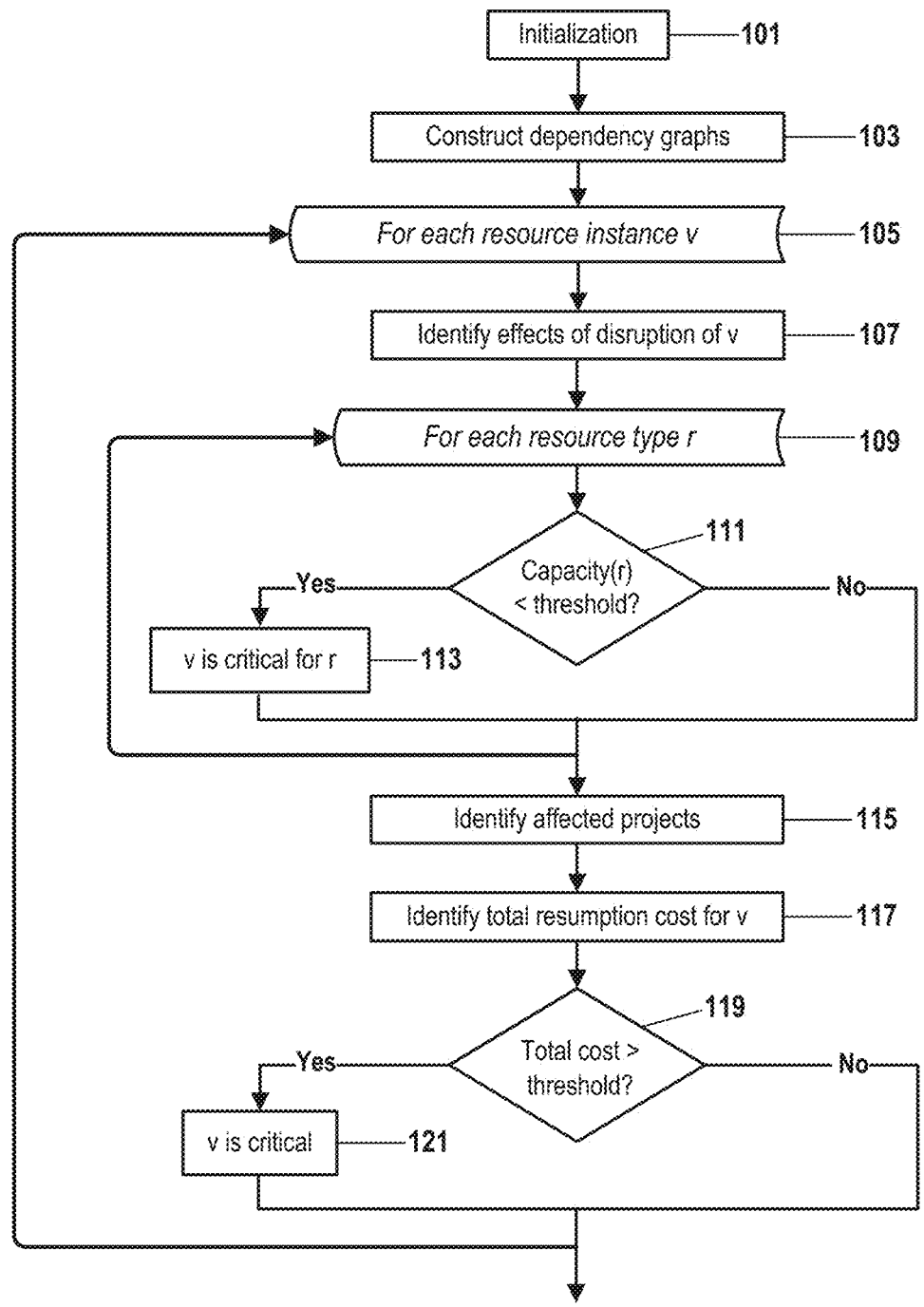
FIG. 1 is a flow chart that illustrates a method for automatically identifying the critical resources of an organization, wherein said method conforms to embodiments of the present invention.

Embodiments of the present invention provide a method, computer program product, computer system, and process for automatically identifying the critical resources of an organization.

Aspects of the present invention may be components of a larger business-continuity plan, wherein such a plan is designed to help an organization maintain acceptable levels of service during a crisis.

An organization may leverage a network of resources in order to maintain one or more "projects," wherein a project may be associated with a service provided to the organization's clients. A project may require one or more instances of one or more types of resources, and a minimum threshold capacity value may be associated with a combination of project and resource instance. If the capacity of a resource instance available to a project falls below the minimum threshold capacity value associated with the project and the resource instance, the project may be rendered "infeasible," or unable to provide a service.

Capacity of a resource type or resource instance may be measured in any appropriate units. In examples, a capacity of a resource type "network bandwidth" may be measured in units of Kbps or Mbps, the capacity of a resource type "lighting" may be measured in lumens, and the capacity of a resource instance "data center rack space" may be measured in linear feet, open rack units, or square meters.

A resource type may be associated with more than one project. A resource instance may be associated with more than one project. The selection of a resource type to be associated with a resource instance may be a function of the primary type of service provided by the resource instance.

Resource types may include, but are not limited to, wireless communications bandwidth, network-backbone bandwidth, network switches, electrical power, computer data storage, fuel reserves, heaters, air-conditioners, floor space, inventory, capital, consumables, and personnel.

Resource instances may include, but are not limited to, a particular computer data center's electrical power (a possible instance of a resource type "electrical power"), a RAID Type 1 disk-drive array (a possible instance of a resource type "computer data storage"), a field of oil tanks (a possible instance of a resource type "fuel reserves"), and help-desk technicians (a possible instance of a resource type "personnel").

Resource types and resource instances are implementation-dependent and may vary significantly from the above examples. An entity that is considered a resource type in one embodiment may be considered a resource instance in another embodiment.

A project may be assigned one or more resource instances according to rules that may be recorded in one or more allocation procedures. In an example, an Internet Service Provider organization might offer a service or project P that provides 1 Mbps of network bandwidth to a customer. To provide this service, P might require a communications server, site electric power, backbone bandwidth (which may comprise software, cabling, and a rack of communications gear), and a system administrator. In a variation of the current example wherein the organization has defined "computer," "power," "bandwidth," and "computer staff" resource types, an allocation procedure A0 might fill P's resource-type requirements with assets that represent resource instances of the resource types required by P. A0 thus might allocate to P a communications server CS-201 (an instance of "computer" resource type), site electric power (an instance of resource type "power"), 1 Mbps of bandwidth on Ethernet LAN L01-4 (an instance of resource type "bandwidth"), and a system administrator (an instance of resource type "computer staff").

In another example, a project P1 may require exclusive access to a "server" resource type configured with a unit license of a "network-management software" resource type. An allocation procedure A1 might comprise instructions to allocate to P1 a server 302-2 located in building S302, to install a licensed copy of Rev. 2.1 network-management software on server 302-2, and to restrict access to server 302-2 such that no other project may access 302-2's services.

The above examples should not be construed to limit the complexity of or the ways in which allocation procedures may be implemented in embodiments of the present invention. The business needs and internal structure of an organization may dictate the form and content of the organization's allocation procedures. Allocation procedures may be recorded on different media and may comprise complex or conditional steps, depending on the organization's needs and internal structure. The content of an allocation procedure may be determined or influenced by implementation-dependent prioritization factors, conditional steps, and other guidelines or constraints incorporated into allocation procedures.

Subtle or complex allocation procedures may be fully or partially determined by or may comprise functions of the organizational, technical, or contractual constraints and priorities of one or more projects. An allocation procedure may comprise functions of the organizational, technical, or contractual constraints and priorities of the organization as a whole.

An allocation procedure may describe how instances of resources are allocated or reallocated to one or more projects in response to a disruption of one or more resource types. A disruption of a resource type may result in an unavailability of one or more units of one or more instances of one or more resource types.

A disruption of, or the unavailability of one or more resource types, is called a "scenario." Scenarios may comprise, but are not limited to, natural or manmade disasters, malicious attacks, software failures, equipment outages, scheduled maintenance operations, or worker unavailability. Planning ways to maintain business continuity during a scenario requires a way to identify "critical" resource types or instances necessary to keep projects and services functional.

In practice, identifying critical resource types or critical resource instances may be a complex procedure that requires understanding of subtle, dynamic relationships among resource types, resource instances, projects, and organizational constraints, commitments, and priorities. Such identifying is often performed manually by employees of the organization familiar enough with the organization's operations and structure to make educated guesses about the resource criticality. Embodiments of the present invention improve upon such methods by accurately, deterministically, and automatically identifying critical resources.

In embodiments of the present invention, a minimum-capacity threshold value $ThrCap_r$ may be associated with a resource type r, wherein $ThrCap_r$ specifies the minimum capacity of r required by an organization. Resource type v may be identified as "critical for resource r" if disruption of resource type v directly or indirectly reduces resource type r's capacity to a value less than r's minimum-capacity threshold value $ThrCap_r$. The wording of this identification may vary, but in all cases, the underlying meaning remains the same: the availability of sufficient capacity of resource type v is necessary to maintain critical capacity of resource type r.

A project P that requires k resource types may be expressed as an ordered pair (D,C), wherein $D=(d_1, d_2, d_3, \ldots, d_k)$ and each project resource-capacity threshold value $d_i$ equals the minimum number of units of resource type i needed by P, and wherein C is a set of additional constraints on the ways that resource types may be used by the organization.

P may be rendered "infeasible" (that is, become unable to provide its primary service) when the capacity of a resource type i available to P falls below the corresponding threshold value $d_i$ associated with P and i.

If a project P requires a resource instance i, P and i may be associated with a project resource-instance capacity threshold value $ThrPrj_{P,i}$. P may then be rendered infeasible when a capacity of resource instance i available to P falls below the value of $ThrPrj_{P,i}$. In other embodiments, reduction of a capacity of a resource type r may result in a reduction of the capacity of a resource instance i available to P, wherein resource instance i is an instance of resource type r.

In an example, project P's requirements for resource type "bandwidth" might be associated with a project resource-threshold value $d_{P,bw}=1$ Mbps. If equipment failures sufficiently disrupt resource type "bandwidth" to make it impossible to allocate 1 Mbps of resource type "bandwidth" to project P, then P may become infeasible and the organization could no longer rely on P to service an affected customer with 1 Mbps of bandwidth.

When a project is rendered infeasible by insufficient capacity of a resource type r, that project may be able to resume operation by substituting available units of another resource type for unavailable units of resource type r. Such a resumption may incur resumption costs.

A procedure for resuming an infeasible project may be described in one or more resumption plans. A resumption plan may comprise constraints upon ways of substituting resources in order to resume an infeasible project. Such constraints may be described in one or more substitutability rules, as described below.

In an example, a power failure may render a project P infeasible by reducing the capacity of resource type "bandwidth" such that it is impossible to satisfy P's requirement for 1 Mbps of resource type "bandwidth." In such a case, however, it might be possible to resume P by substituting available units of resource type "wireless bandwidth" for some or all unavailable units of disrupted resource type "bandwidth." Such substitution might incur costs that may be a function of the tasks of switching the project to a substitute network and of installing substitute software on P's server. In addition to these "substitution costs," some embodiments may also experience project-specific "time-delay costs" that may be a function of the amount of project downtime required to effect the substitution.

Resumption costs may be a function of a subset of substitution costs, time-delay costs, and other types of costs that may be directly or indirectly related to project resumption.

In an example, a project P may require a server configured with Rev. 2.1 network-management software require and exclusive access to a high-speed LAN. If P becomes infeasible under a scenario S that make P's server and dedicated LAN unavailable, a resumption plan R might comprise instructions to restore P to operation under scenario S by: allocating to P the services of server M-25 located in building MEBP4; installing Rev. 2.1 software on server M-25; switching the high-speed LAN of building MEBP4 to P; and stalling any other project that may require the high-speed LAN of building MEBP4.

The above example should not be construed to limit the ways that resumption plans may be implemented or recorded. Resumption plans may be created in many forms and may comprise complex or conditional steps, depending on the organization's needs and internal structure. Resumption plans may address multiple simultaneous, concurrent, or overlapping scenarios.

A scenario may reduce the available capacity of a resource type or instance, such that remaining capacity is insufficient to meet the needs of all projects. In a simple example, if scenario S1 reduces the total capacity of resource type "bandwidth" to 500 Kbps, then a project that requires 1 Mbps of bandwidth must become infeasible. In another example, if capacity of resource type "bandwidth" drops to 400 Kbps, a resumption plan might comprise rules for deciding how to allocate bandwidth between two projects that each need 300 Kbps of bandwidth.

Resumption plans may comprise subtle or complex allocation decision rules or substitution decision rules, wherein at least one of those decision rules may be influenced by or determined as functions of the constraints C of one or more projects P=(D,C). Resumption-plan decision rules may be facilitated by implementation-dependent prioritization factors, conditional steps, and other guidelines or constraints incorporated into allocation procedures.

A project P may be associated with a project resumption-cost threshold value $ThrRes_P$. In such embodiments, a resource type v may be identified as "critical" if, should disruption of a resource type v directly or indirectly render P infeasible, a total cost $Cost_P$ to resume project P exceeds P's resumption-cost threshold $ThrRes_P$.

If a project P requires more than one resource type, an analogous project resumption-cost threshold value $ThrRes_{P,r}$ may specify a distinct resumption-cost threshold associated with a resource-specific cost to resume P, wherein said resource-specific cost is a function of only a direct or indirect effect of a disruption of a resource type r.

An organization may define a global resumption-cost threshold value $ThrRes_v$ that sets a threshold value for the sum of all resumption costs of every project that is directly or indirectly rendered infeasible (or "affected") by a disruption of a resource type v. In embodiments, a resource type v may be identified as "critical" if the value of $ThrRes_v$ is exceeded by a cost to resume all projects affected by the disruption of resource type v. In other embodiments, a resource type v may be identified as "critical" if, when disruption of resource type v directly or indirectly renders one or more projects of the organization infeasible, the value of $ThrRes_v$ is exceeded by a cost to resume a subset of affected projects.

Organizational personnel may define values of $ThrRes_P$ (which contains a threshold value, as described above, for the resumption cost of a single project P affected by a disruption of a resource type v) or $ThrRes_v$ (which contains a threshold value, as described above, for the total resumption cost of all projects affected by a disruption of a resource type v).

Two resource types may be related by a dependency relationship, wherein the total or partial disruption of a first ("independent") resource type may result in the total or partial disruption of a second ("dependent") resource type. In some embodiments, such a dependency relationship may spawn analogous dependency relationships between pairs of resource instances, wherein a resource type of an independent resource instance and a resource type of a dependent resource instance in such a spawned resource-instance dependency relationship both match corresponding resource types of an independent resource type and a dependent resource type in a more general resource-type dependency relationship.

In an example, a resource-type dependency relationship that identifies resources of type "computer" as dependent upon resources of type "power" might spawn an analogous dependency relationship between an instance of the "power" resource type and an instance of the "computer" resource type. Such a spawned analogous relationship might, for example, allow an organization to predict that a project P's "communications server" instance of resource type "computer" would become unavailable upon the failure of P's "electric power" instance of resource type "power."

In embodiments, a dependency relationship may define a relationship between a first dependent resource type and a second independent resource type wherein the capacity of the first dependent resource type is reduced, but not completely eliminated, by a reduction in capacity or a complete unavailability of the second independent resource type.

In some embodiments, resource dependencies may be limited to directional relationships. In an example of one such embodiment, a dependency relationship that identifies a server resource as unavailable during a power resource failure does not imply a converse dependency that would make an electrical power resource dependent upon the availability of a server resource.

Dependencies may be transitive. If, for example, resource A depends upon resource B, and resource B depends upon resource C, then A depends upon C. In an example, if the availability of bandwidth depends upon the availability of a server and the availability of the server depends upon the availability of power, then the bandwidth resource is unavailable without power.

Dependency relationships may be represented as one or more data structures or mathematical objects, such as an array or matrix.

A set of dependency relationships that identify a plurality of resource types upon which a resource type u is dependent may be represented as a directed graph. A directed graph is a mathematical structure comprised of a set of values called nodes or vertices and a set of ordered pairs of those nodes. Each ordered pair is called an edge and the order of two nodes in an edge defines the direction of a one-way relationship between those two nodes.

In an example, a directed graph DG might contain a set of nodes that comprise the first five letters of the alphabet, and a set of four edges that each define the sequence in which an adjacent pair of letters are ordered in the alphabet:

$$DG=(\{A,B,C,D,E\}, \{(A,B), (B,C), (C,D), (D,E)\})$$

In this example, each edge defines an alphabetic-ordering relationship between two adjacent letters such that the alphabetic position of the first node of an edge immediately precedes the alphabetic position of the second node of that edge. Because the relationship defined by an edge of a directed graph depends upon the order of the edge's nodes, interchanging two letters in any of DG's edges would destroy DG's alphabetic ordering.

A set of dependency relationships that identify resource types upon which a resource type u is dependent may be represented as a directed graph $G_u$, wherein $G_u$ may be known as a "dependency graph" associated with resource type u. Such a dependency graph $G_u$ comprises a set of nodes $\{u, v_1, v_2, \ldots, v\}_n$ and a set of edges that each contain an ordered pair of two nodes. In such a graph $G_u$, every edge comprises the node u and a node $v_i \in \{v_1, v_2, \ldots, v_n\}$, wherein $v_i$ represents a resource type $i \neq u$ upon which u depends and wherein each $v_i$ is included in exactly one edge. In such a graph, an $i^{th}$ edge thus may describe a dependency relationship between the dependent resource type u and an independent resource type i. In such embodiments, such a directed graph $G_u$ may specify that node u may function at full capacity only when all of nodes $v_1, v_2, \ldots, v_n$ function properly.

In some embodiments, the first node of each edge in a dependency graph represented as a directed graph may denote a dependent resource type and the second node in each said edge may denote an independent resource type upon which the first node depends. In other embodiments, the order of the two nodes in each edge may be reversed. But in all such cases, the ordering must be consistent among all edges in a dependency graph represented as one or more directed graphs.

In an example, if resources of resource type u depend upon resource types a, b, and c, dependency graph $G_u$ might comprise:

$$G_u=(\{u, a, b, c\}, \{(u,a), (u,b), (u,c)\})$$

A scenario that comprises an initial disruption of a single resource type u may, through dependency relationships, result in a direct or indirect disruption of other resource types. Traversing an organization's dependency graphs may identify other resource types that are directly or indirectly disrupted as a result of a disruption of resource type u. Such a set of disrupted resource types may be used to predict the initial disruption's cascading direct and indirect effects on projects that require disrupted resource instances or resource types, wherein said disrupted resource instances or resource types are directly or indirectly disrupted when resource type u is disrupted.

An organization may define a unique geographic hierarchy graph G1, wherein G1 may be represented as a rooted acyclic directed tree with all edges directed away from the root. In other embodiments, G1 may be represented as a different type of abstract or mathematical object or model.

If G1 is represented as a directed graph, each node or vertex of G1 may represent a physical or virtual location and each edge may comprise an ordered pair of nodes, wherein a first node of an ordered pair represents a more narrowly defined location and a second node of the ordered pair represents a less narrowly defined representation of the same location. In some embodiments, the order of nodes in each edge may be reversed, but in all such cases, the ordering must be consistent among all edges of a geographic hierarchy graph represented as a directed graph. The nodes or vertices of a geographic hierarchy graph as a directed graph may represent geographic locations associated with an organization's projects, assets, resources, or other entities.

The root node of a geographic hierarchy graph as a directed graph may contain a value that identifies the most general description of a location of the organization. In embodiments, this root value may identify the country in which an organization is headquartered.

A complete path through such a geographic hierarchy graph might comprise a directed path from a root node that contains a value that represents the country in which the organization's headquarters resides to a leaf node that contains a value that represents the graph's most narrow representation of a location of one of the organization's projects, assets, resources, or other entity.

In one example, an edge of a geographic hierarchy graph might comprise an ordered pair of nodes that identify a location of a regional switching hub in the borough of Manhattan in New York City. In this example, the first (more general) node of a first edge might contain a value that represents New York State. The second (less general) node of the first edge might contain a value that represents New York City. A second edge might extend the directed path of the first edge by comprising an ordered pair that comprises a more general first node that contains a value representing New York City and a less general node that contains a value that represents the New York City street address of the organization's regional switching hub.

If G1 is represented by an acyclic object or model, no path through edges of G1 may traverse a same node more than once. All directed paths through a geographic hierarchy graph represented as a directed graph may extend from the graph's root node through one of the graph's leaf nodes.

In many cases, an organization may require only one geographic hierarchy graph or only one set of geographic hierarchy graphs, wherein said graph or graphs may be used to estimate a cost to substitute units of a resource and wherein that cost may be a function of a number of edges along a directed path of the geographic hierarchy graph between a node of the graph that represents a unit of a replaced or disrupted resource instance and a node of the graph that represents a unit of a replacing or substituting resource instance.

An initial result of a dependency-graph analysis under a condition specified by one or more scenarios may be modified by one or more substitutability rules that may specify a condition under which available units of a replacing or substituting resource type or of a replacing or substituting resource instance may replace an unavailable unit of a replaced or disrupted resource type or of a replaced or disrupted resource instance.

A substitutability rule may allow an organization to resume a project rendered infeasible by a direct or indirect effect of a resource-type disruption, wherein said rule allows said resumption by stating constraints upon the ways that an unavailable unit of one or more instances of a replaced or disrupted resource type may be replaced by available units of a replacing or substituting resource instance of a resource type, wherein said unavailable unit had been rendered unavailable by a direct or indirect effect of said resource-type disruption. Substitutability rules may be used to predict or estimate a project-resumption cost, wherein said project-resumption cost may be a function of a cost to resume one or more projects that had been rendered infeasible by a direct or indirect effect of a disruption of one or more resource types.

A substitutability rule may permit a project to resume even when two or more scenarios overlap or occur simultaneously or concurrently. In one example, if project P1 becomes infeasible under scenario S1 because of insufficient capacity of resource type u under S1 and project P2 becomes infeasible under scenario S2 because of insufficient capacity of resource type v under S2, one or more substitutability rules may be able to return one or both projects to operation by transferring available units of instances of resource type v from P1 to P2 or by transferring available units of instances of resource type u from P2 to P1.

In this and similar examples, such a solution fails when the total available capacity of a resource type under a scenario is too low to meet the demands of both projects under any conditions. In such cases, one or both projects may be resumed by substituting units of one or more other types of resources for unavailable units of resource type u or resource type v. If, for example, 500 Kbps of available resource type "WiFi bandwidth" cannot satisfy the requirements of either of two projects that each require 600 Kbps of WiFi bandwidth, a substitutability rule may enable both projects to resume by allowing the 700 Kbps of unavailable WiFi bandwidth to be replaced by 700 Kbps of an instance of an available resource type "satellite bandwidth." In another example, a project that requires resource type "mainframe computer" may be resumed even if no "mainframe computer" resources are available if a substitutability rule allows the substitution of an available resource type "Linux workstation" for unavailable "mainframe computer" resources.

A substitutability rule may specify a general relationship between resource types, wherein said general relationship may permit a first number of units of an available resource type to be substituted for a second number of units of an unavailable resource type. Such a substitutability rule may be expressed as:

$$\{Rtype, (type_1, vol_1), (type_2, vol_2), (type_3, vol_3), \ldots ), (type_n, vol_n)\}$$

where Rtype identifies the unavailable resource type that is to be replaced, and each ordered pair ($type_i$, $vol_i$) specifies that one unit of resource type Rtype may be replaced by $vol_i$ units of resource type $type_i$.

A set of substitutability rules may not be transitive, meaning that a first rule stating that units of a resource type A may replace a unit of a resource type B and a second rule stating that units of resource type B may replace a unit of a resource type C, does not necessarily imply that units of A may replace one or more units of C. Substitutability rules may be directional, meaning that a substitutability rule stating that units of a resource type A may replace units of a resource type B does not necessarily imply that units of B may replace one or more units of A.

A substitutability rule may define a relationship between a pair of resource instances. A plurality of substitutability rules may describe constraints upon ways that units of a first plurality of resource types may jointly replace units of a second plurality of resource types.

Consider, for example, a substitutability rule:

$$\{bandwidth, (shared\ cable\ bandwidth, 1.5)\}$$

that may specify that 1.5 units of resource type "shared cable bandwidth" may be substituted for a unit of resource type "bandwidth." Thus, if project P requires 1 Mbps of resource type "bandwidth," P would initially become infeasible in scenarios that reduce available bandwidth capacity to 900 Kbps, which is 100 Kbps short of P's requirement. But if 150 Kbps of resource type "shared cable bandwidth" is available, the above substitutability rule might allow P to resume by substituting 1.5 units of resource type "shared cable bandwidth" for each unavailable required unit of resource type "bandwidth."

Substitutions may incur substitution costs and time-delay costs. Substitution costs and time-delay costs may be a direct or indirect function of a distance between a physical location of an available unit of a substituting resource and a physical location of an unavailable unit of a disrupted, replaced resource. In embodiments of the present invention wherein a cost analysis may identify a resource type as being a critical resource or as being critical for another resource type, such identifying may be implemented as a function of a substitution cost or a time-delay cost.

In summary:

$ThrCap_r$ is the minimum available capacity of resource type r required by an organization A resource type v is identified as "critical for resource r" if disruption of v directly or indirectly reduces the available capacity of r to a value less than $ThrCap_r$.

A project P that consumes k resource types may be expressed as (D,C), wherein:
$D=(d_1, d_2, d_3, \ldots, d_k)$
$d_r$=the minimum capacity of resource type r required by P, and
C is a set of additional constraints on resource usage.

$ThrRes_v$ is the cost to resume all projects rendered infeasible by a disruption of resource type v.

Resource type v is identified as "critical" if a cost to resume all projects affected by a disruption of v results in a resumption cost exceeding a resumption-cost threshold $ThrRes_v$.

A dependency graph $G_v$ states dependency relationships wherein disruption of one or more independent resource types results in disruption to a dependent resource v.

G1 is a geographic hierarchy graph that represents a geographic distribution of an organization's resources.

Substitutability rule R=$\{Rtype, (type_1, vol_1), (type_2, vol_2), \ldots (type_n, vol_n)\}$, where:
Rtype=an unavailable resource type that is to be replaced, and
($type_i$, $vol_i$)→1 unit of Rtype may be replaced by $vol_i$ units of resource type $type_i$.

FIG. 1 is a flow chart that illustrates a method for automatically identifying the critical resources of an organization, wherein said method conforms to embodiments of the present invention. FIG. 1 includes steps 101-121.

A resource type v may be identified as "critical for resource r" if disruption of resource type v reduces a capacity of resource type r to a value below a minimum-capacity threshold $ThrCap_r$, wherein $ThrCap_r$ may specify the minimum available capacity of r required by the organization. In a trivial embodiment, v and r may identify the same resource type.

A resource type v may be identified as "critical" if a total resumption cost to resume all projects that have been directly or indirectly rendered infeasible by a disruption of resource type v exceeds the value of a resumption-cost threshold.

In step 101 of FIG. 1, the system is initialized. Initialization may comprise modeling some or all of the business functions of the organization, wherein said modeling may include, but not be limited to, defining entities and values that may include, but are not limited to projects and services, resource types, resource instances, associations between resource types and resource instances, threshold values, substitutability rules, resource dependency relationships, allocation procedures, resumption plans, one or more geographic hierarchy graphs, constraints on the use of resource types, constraints on the use of resource instances, and other parameters, definitions, structures, values, rules, thresholds, and procedures that an organization may deem necessary and that conform to embodiments of the present invention.

Defined threshold values may include but are not limited to any threshold values necessary for correct operation of embodiments of the present invention, including, but not limited to, a resource-type capacity threshold value $ThrCap_r$ for a resource type r, a project resource-capacity threshold value $d_{P,r}$ for a resource type r required by a project P, and a global resumption-cost threshold value $ThrRes_v$ for a resource type v.

The initialization of step 101 may comprise definition of substitutability rules for one or more resource types, definition of resumption plans for one or more projects, and definition of allocation procedures for one or more projects.

One or more threshold values, substitutability rules, resumption plans, or allocation procedures may be derived fully or in part from clients of, employees of, or other persons or entities associated with the organization. One or more threshold values, substitutability rules, resumption plans, or allocation procedures may be derived fully or in part from third-party documentation, licensing agreements, service agreements, other contractual obligations, other documents, or some combination thereof. One or more parameters, values, relations, definitions, rules, plans, and procedures may not be fully or partly defined, assigned, or initialized.

In step 103, a resource-dependency graph $G_v$ may be constructed for each resource type v defined and initialized in step 101, according to the dependency relationships defined and initialized in step 101.

Step 105 initiates an iterative process that comprises steps 105-121 and which may be repeated once for each resource type v.

Step 107 determines direct and indirect effects that a disruption of resource type v may have upon other resource types. Said determining may identify an available capacity of a resource type in a scenario wherein resource type v is disrupted. Said determining may be performed by traversing some or all of said dependency graphs constructed in step 103. In embodiments wherein one or more dependency graphs are represented as directed graphs, said determining may be fully or partially performed by traversing some or all directed paths of said dependency graphs represented as directed graphs, wherein said traversal may be implemented as any of the directed graph-traversal algorithms that are well-known to those skilled in the art of mathematical modeling. Step 107 may determine that a disruption of a resource type v may directly or indirectly result in cascading effects upon the capacities of a plurality of resource types.

Step 109 initiates an iterative process that comprises steps 109-113, wherein a set of iterations of the process initiated by step 109 may be nested within an iteration of the process initiated by step 105, wherein an iteration of the process initiated by step 105 may be performed once for a resource type v, and wherein an iteration of said nested set of iterations of the process initiated by step 109 may be performed once for a resource type r.

The iterative process initiated by step 109 may be performed for only affected resource types r, wherein the capacity of an affected resource type r may be directly or indirectly reduced or otherwise affected by a disruption of resource type v.

Step 111 determines whether a disruption of resource type v directly or indirectly reduces the capacity of resource type r to a value below resource type r's capacity threshold value $ThrCap_r$. If a disruption of resource type v may directly or indirectly reduce the capacity of resource type r to a value below said $ThrCap_r$, then step 113 may be performed.

Step 111 may comprise other methods of determination that, rather than compare the capacity of resource type r to a fixed threshold value, might select a default determination that may be a function of a resource type associated with the determination or of a resource instance associated with the determination, or might use other criteria to determine whether step 113 should be performed. Such determinations may, for example, compare the capacity of resource type r to a variable threshold value, add contingent steps to the determination method, or employ one or more threshold values that depend upon extrinsic parameters that may include, but are not limited to, time of day, season of the year, energy costs, environmental factors, political considerations, geographical constraints, economic factors, or constraints on the availability of some combination of other organizational resources.

If a disruption of resource type v does not directly or indirectly reduce the capacity of resource type r to a value below said $ThrCap_r$, no action is taken and the iterative process initiated in step 109 begins a next iteration for the next value of resource type r. These iterations of the iterative process initiated in step 109 continue until the iterative process initiated in step 109 has considered all possible values of resource type r, at which point the iterative process of step 109 terminates and step 115 may be performed.

Step 113 may be performed when step 111 determines that a disruption of resource type v may directly or indirectly reduce the capacity of resource type r to a value below resource type r's capacity threshold value $ThrCap_r$. In other embodiments, step 113 may be performed when other determination criteria, as described above, are satisfied.

In response to this determination, Step 113 identifies resource type v as "critical for resource type r." This identification may be phrased differently, wherein said different phrasing communicates the determination that a disruption of resource type v may directly or indirectly place resource type r in a critical state. Such different phrasings may include, but are not limited to "resource v is critical for resource r," or "resource r is critically dependent upon resource v."

After the completion of step 113, the iterative process initiated in step 109 begins a next iteration, wherein said next iteration considers a next value of resource type r. These iterations continue until the process initiated in step 109 has considered all permissible values of resource type r, at which point the iterative process initiated by step 109 terminates and step 115 may be performed.

Iterations of the iterative process of steps 109-113 may identify v as critical for no resource types or for one or more resource types.

Step 115 identifies affected projects that are directly or indirectly rendered infeasible by a disruption of resource type v. Said identification may be a function of a list of critically dependent resource types created by one set of iterations of the iterative process of steps 109-113, wherein a disruption of resource type v directly or indirectly reduces a capacity of a critically dependent resource type of said list of critically dependent resource types to a value less than a value of a minimum-capacity threshold value associated with said critically dependent resource type.

Step 117 may identify a total resumption cost incurred by resuming all affected projects that may be directly or indirectly rendered infeasible by a disruption of a resource type v. In some embodiments, step 117 may identify a total resumption cost incurred by resuming a subset of said all affected projects that may be directly or indirectly rendered infeasible by a disruption of a resource type v. Some or all of said affected projects may have been identified in step 115.

A resumption cost may be a function of a combination of direct or indirect project-resumption costs that may include substitution costs, time-delay costs, and other costs that may be directly or indirectly related to the resumption of one or more affected projects that may be directly or indirectly related to a disruption of resource type v. Resumption costs may be a function of other parameters, relationships, and entities that may comprise, but are not limited to, the organization's substitutability rules, allocation procedures, resumption plans, dependency relationships, geographic hierarchy, or distances in a geographic hierarchy between resource instances.

Step 119 determines whether said total resumption cost identified by step 117 exceeds a resource type v resumption-cost threshold value $ThrRes_v$. If said total resumption cost does exceed said resumption-cost threshold, then step 121 may be performed. If said total resumption cost does not exceed said resumption-cost threshold, then the iterative process initiated in step 105 begins a next iteration, wherein said next iteration considers the next value of resource type v. Said iterations of the iterative process initiated in step 105 continue until the process initiated in step 105 has considered all permissible values of resource type v, at which point the iterative process of steps 105-121 terminates and the process of FIG. 1 is complete.

In embodiments, step 119 may comprise determinations that, rather than compare a total resumption cost to a fixed threshold value, might select a default determination that may be a function of a resource type associated with said determination, a resource instance associated with said determination, or a funding source associated with said determination, or might use other criteria to determine whether step 121 should be performed. Such a determination may, for example, compare a total resumption cost to a variable threshold value, perform contingent steps, compare a total resumption cost to a different value or functional result, compare a cost that is determined in a different manner, or employ one or more threshold values that depend upon extrinsic parameters that may include, but are not limited to, time of day, season of the year, energy costs, environmental factors, political considerations, geographical constraints, economic factors, or constraints on the availability of some combination of other organizational resources.

If a step 119 determines that its test criteria are satisfied for resource type v, then step 121 identifies resource type v as critical and the iterative process initiated in step 105 begins a next iteration, wherein said next iteration considers a next value of resource type v. These iterations continue until the process initiated in step 105 has considered all permissible values of resource type v, at which point the iterative process of step 105-121 terminates and the process of FIG. 1 completes.

Upon the completion of the last iteration of the iterative process of steps 105-121, embodiments of the present invention may have automatically identified a list of critical resource types and a list of resource types that are each critical for an other resource type.

Figure 2:
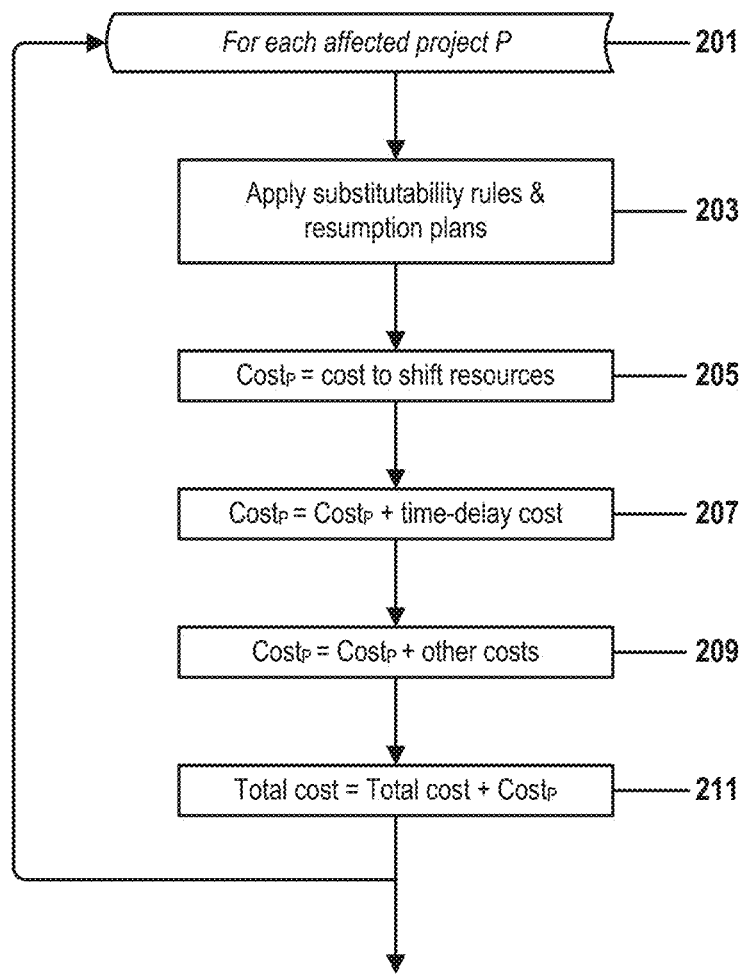
FIG. 2 is a flow chart that illustrates step 117 of FIG. 1 in more detail, wherein step 117, in conformance with embodiments of the present invention, identifies a total resumption cost directly or indirectly caused by a disruption of an initially disrupted resource type v.

FIG. 2 is a flow chart that illustrates step 117 of FIG. 1 in more detail, wherein step 117, in conformance with embodiments of the present invention, identifies a total resumption cost directly or indirectly caused by a disruption of an initially disrupted resource type v. FIG. 2 comprises steps 201-211.

A total resumption cost may be a function of a plurality of project-resumption costs, wherein a project-resumption cost of said plurality of project-resumption costs may comprise a cost to resume an affected project that has been directly or indirectly rendered infeasible by a disruption of a resource type v.

In other embodiments, a total resumption cost may be a function of a subset of said plurality of project-resumption costs, wherein said subset may comprise a cost to resume a subset of all affected projects, wherein said affected projects have been directly or indirectly rendered infeasible by a disruption of a resource type v.

Step 201 initiates the iterative process of steps 201-211, wherein an iteration of said iterative process may be performed for an affected project P. Said affected project P may be a project that has been identified as an affected project by step 115 of FIG. 1, and has been directly or indirectly rendered infeasible by a disruption of a resource type v. One full set of iterations of the iterative process of steps 201-211 may consider unaffected instances of project P, where said unaffected instances represent projects that are not directly or indirectly rendered infeasible by a disruption of a resource type v.

The iterative process of steps 201-211 may identify a resumption cost $Cost_P$ for an affected project P, and may then add a value of said identified $Cost_P$ to a running total cost of resumption. Said total cost of resumption may be a function of all the costs incurred by the resumption of some or all affected projects, wherein said affected projects have been directly or indirectly rendered infeasible by a disruption of a resource type v. In other embodiments, said total cost of resumption may have been initialized to a null value or to some other default value or functional result prior to commencement of a first iteration of the iterative process of steps 201-211.

An iteration of the iterative process of steps 201-211 considers one affected project P. Instances of P are considered by said the iterative process of steps 201-211 in order of decreasing priority, wherein a greater priority is associated with an instance of P deemed to be of greater importance to the organization.

Step 203 may apply one or more substitutability rules in order to resume an affected project P that has been rendered infeasible by a disruption of a resource type v. Substitutability rules may permit an affected project to resume operation by allowing the affected project P to replace unavailable units of a first resource type, wherein P is rendered infeasible by the lack of said unavailable units, with substitute units of an available second resource type.

It may not be possible to resume one or more projects by applying substitutability rules. An organization may have no substitutability rules that are applicable to an affected project P and an initially disrupted resource type v when P has been directly or indirectly rendered infeasible by a disruption of v. In some embodiments, default substitutability rules may be applied, wherein decisions about resource substitutions may be made as a function of the distance between resources in a geographic hierarchy, or as a function of other parameters, procedures, priorities, guidelines, or constraints specified by the organization.

Step 203 may apply one or more project P resumption plans in conjunction with, or in place of, substitutability rules, wherein a project P resumption plan may state a set of actions that may be taken in order to resume project P after P has been rendered infeasible by a disruption of one or more resource types.

Upon completion of the application of substitutability rules or resumption plans, or upon the completion of other actions and procedures associated with the resumption of affected project P, step 203 may have performed steps that in aggregate may restore affected project P to operation, wherein said P was directly or indirectly rendered infeasible by a disruption of a resource type v.

In step 205, $Cost_P$, wherein $Cost_P$ is an accumulated cost to resume affected project P, may be initialized to a resource-shifting cost incurred by shifting or reallocating units of available resources to affected project P in order to replace units of one or more resource instances that had directly or indirectly been rendered unavailable to said project P by a disruption of a resource type v. Said resource-shifting cost may be known as a substitution cost. A substitution cost may comprise other costs associated with the resumption of a project rendered infeasible by the unavailability of a resource required by said infeasible project.

A plurality of details may affect the value of said resource-shifting cost, wherein said details may comprise, but are not limited to: a type of, an instance of, or a number of units of resources to be shifted to an affected project P, or a type of, an instance of, or a number of units of said project P's resources to be replaced. Said details may be defined by one or more applicable substitutability rules, resumption plans, or other actions and procedures associated with the resumption of said project P.

A resource-shifting cost may be defined as a cost to shift a project P to available substitute resources. Substitutability rules, but not resumption plans, may identify a resource-shifting cost.

In embodiments, $Cost_P$, a cost to resume project P, may be initialized to a null value, to a fixed value, or to some other value. A resource-shifting cost may be initialized as a function of one or more default substitutability rules, wherein said one or more default substitutability rules may predict substitution costs as a function of a geographic distance between a replacing resource instance and a replaced resource instance, as a function of a length of a path on a geographic hierarchy graph between a replacing resource instance and a replaced resource instance, or as a function of other parameters, guidelines, rules, or constraints specified by the organization. In embodiments wherein a resource-shifting cost or an other substitution cost may be predicted or estimated as a function of a distance on a geographic hierarchy graph between a replacing resource instance and a replaced resource instance, said costs may be predicted as a function of a shortest path on a geographic hierarchy graph between a replacing resource instance and a replaced resource instance. If a geographic hierarchy graph is represented as a directed graph, a length of a path on said geographic hierarchy graph may be a function of a number of nodes along said path.

Step 207 may increase a $Cost_P$ value by a time-delay cost for project P, wherein aid $Cost_P$ value may have been initialized in step 205. Said time-delay cost for project P may be a function of the length of time required to resume project P by replacing one or more resource instances that had been directly or indirectly made unavailable to affected project P by a disruption of a resource type v, and wherein said project P is infeasible during said length of time.

A time-delay cost may be a result of a contractual obligation to one or more customers, of a productivity loss, of a direct or an indirect effect of said project P's infeasibility on other projects or customers, of a cost that may be a function of a length of time during which said project P is infeasible, or of a cost that may be a function of a length of time required to resume said infeasible project P.

It is possible that no time-delay cost may be applicable to a project P directly or indirectly rendered infeasible by a disruption of a resource type v. In embodiments, a time-delay cost may equal a null value, a contingent value, a functional result, a preset default value, or an other value that may be associated with delays incurred during a resumption of said project P.

Step 209 may further increase the value of $Cost_P$ by the value of one or more other costs, wherein said one or more other costs may be direct or indirect results of steps taken to resume project P after P has been directly or indirectly rendered infeasible by a disruption of a resource type v. Said one or more other costs may be a function of direct or indirect effects of a disruption of a resource type v. It is possible that no said one or more other costs may be associated with a resumption of a project P directly or indirectly rendered infeasible by a disruption of resource type v. Said one or more other costs may equal a null value, a contingent value, a value returned by a function, a preset default value, or to some other value.

In step 211, a total cost to the organization of resuming one or more affected projects that have directly or indirectly been rendered infeasible by a disruption of a resource type v is incremented by a value of $Cost_P$ set in step 209, wherein said value of $Cost_P$ set in step 209 is a total cost to resume only one instance of project P.

A current iteration of the iterative process of steps 201-211 may terminate at a conclusion of step 211 and a next iteration of the iterative process of steps 201-211 may then begin considering a next instance of project P. Step 211 will have, at said time of termination, determined an interim value of a total cost to the organization of resuming one or more projects that have been rendered directly or indirectly infeasible by a disruption of a resource type v. Step 211 of said next iteration may increase said interim value by a value of a cost to resume said next instance of project P.

If the iterative process of steps 201-211 has been performed for all projects directly or indirectly affected by a disruption of a resource type v, the procedure of steps 201-211 of FIG. 2 may terminate.

Upon termination, the procedure of steps 201-211 may return an accumulated total of direct and indirect costs to resume one or more projects directly or indirectly rendered infeasible by a disruption of a resource type v. Said accumulated total direct and indirect costs may comprise a total cost to the organization of resuming all projects that have directly or indirectly been rendered infeasible by a disruption of resource type v.

Figure 3:
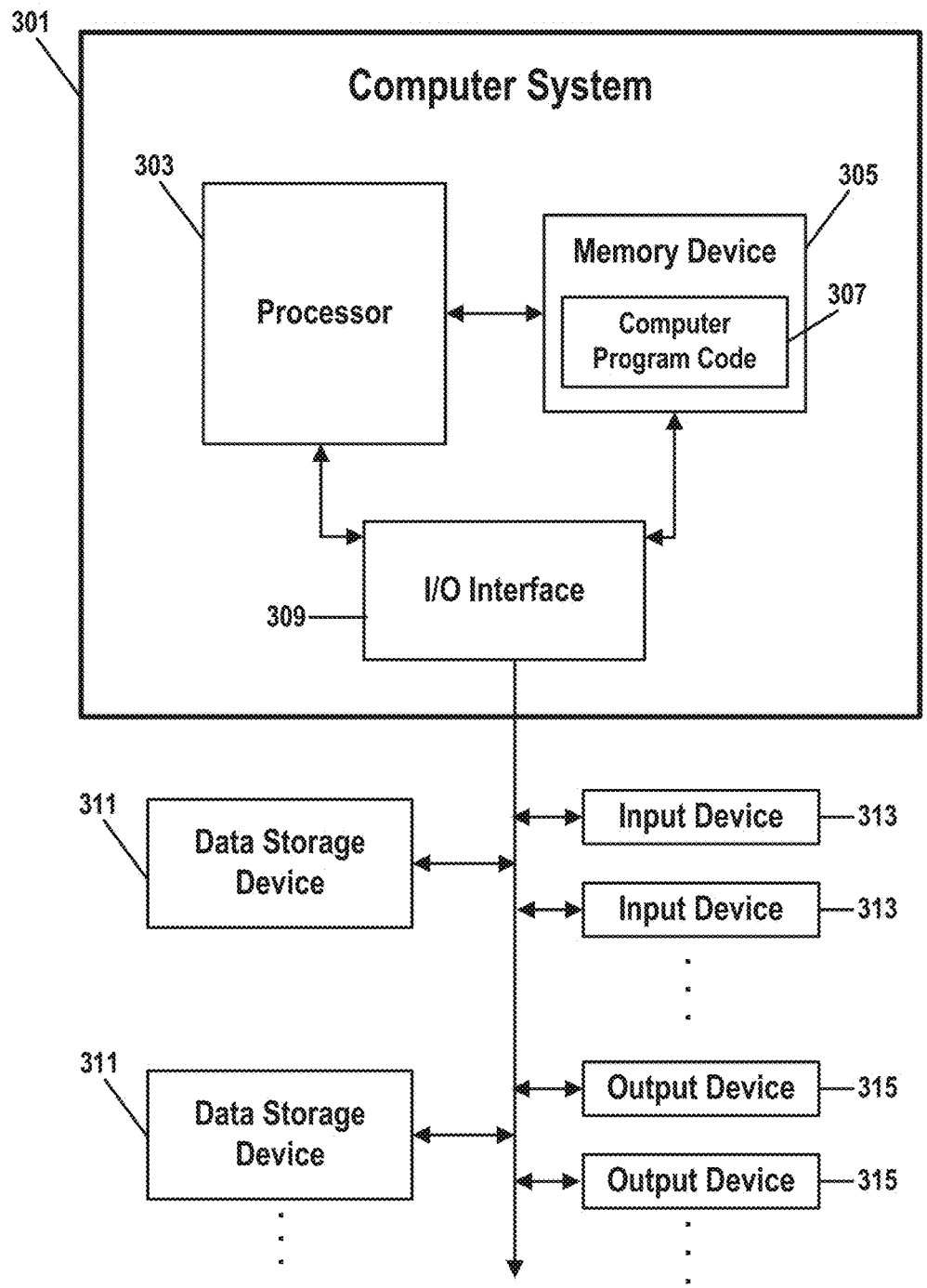
FIG. 3 shows the structure of a computer system and computer program code that may be used for automatically identifying critical resources of an organization, in accordance with embodiments of the present invention.

FIG. 3 shows the structure of a computer system and computer program code that may be used for automatically identifying critical resources of an organization, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code which implement methods of the present invention do not comprise a signal generally, or a transitory signal in particular.

Any combination of one or more computer-readable medium(s) or devices may be used. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIG. 1 and FIG. 2 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart illustrations and/or block diagrams FIG. 1 and FIG. 2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 is also connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for automatically identifying critical resources of an organization, in accordance with embodiments of the present invention and may implement other embodiments described in this specification, including the methods illustrated in FIG. 1 AND FIG. 2. The data storage devices 311 may store the computer program code 307. Computer program code 307 stored in the storage devices 311 is configured to be executed by processor 303 via the memory devices 305. Processor 303 executes the stored computer program code 307.

Thus the present invention discloses a process for supporting computer infrastructure, integrating, hosting, maintaining, and deploying computer-readable code into the computer system 301, wherein the code in combination with the computer system 301 is capable of performing a method for automatically identifying critical resources of an organization.

Any of the components of the present invention could be created, integrated, hosted, maintained, deployed, managed, serviced, supported, etc. by a service provider who offers to facilitate a method of automatically identifying critical resources of an organization. Thus the present invention discloses a process for deploying or integrating computing infrastructure, comprising integrating computer-readable code into the computer system 301, wherein the code in combination with the computer system 301 is capable of performing a method for automatically identifying critical resources of an organization.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise said computer-readable hardware storage device.

What is claimed is:

1. A method for compensating for reduced availability of a disrupted project resource,
    where a first resource comprises a set of instances of the first resource that are each associated with a corresponding available amount of the first resource that is made available by that instance,
    where a total available capacity of the first resource is a sum of available amounts of the first resource that are made available by all instances of the set of instances,
    where the project requires a first instance of the set of instances, a second instance of the set of instances, and a third instance of the set of instances,
    where the first instance identifies a first available amount of the first resource that is available to the project,
    where the second instance identifies a second available amount of the first resource that is available to the project,
    where the third instance identifies a third available amount of the first resource that is available to the project, and
    where a disruption of the first; second, or third instance results in a corresponding reduction of the first; second, or third available amount,
    the method comprising
    a processor of a computer system identifying an initial value of the total available capacity as a sum of the first available amount, the second available amount, and the third available amount;
    the processor receiving a set of dependency relationships,
        where a first dependency relationship of the set of dependency relationships identifies that an initial disruption of the first instance causes a second disruption of the second instance, and
        where a second dependency relationship of the set of dependency relationships identifies that the second disruption causes a disruption of the third instance;
    the processor determining that the initial disruption:
        directly results in a reduction of the first available amount by a first-instance reduction amount,
        indirectly results, as a function of the first dependency relationship, in a reduction of the second available amount by a second-instance reduction amount and
        indirectly results, as a function of the second dependency relationship, in a reduction of the third available amount by a third-instance reduction amount; and
    the processor, as a result of the determining, decreasing the total available capacity of the first resource by a sum of the first-instance reduction amount, the second-instance reduction amount, and the third-instance reduction amount.

2. The method of claim 1, further comprising the processor characterizing the first resource as being critical if the decreased total available capacity is less than a capacity threshold value.

3. The method of claim 1, further comprising:
    the processor characterizing the first resource as being critical if a resumption cost exceeds a resumption-cost threshold value, where the resumption cost is a cost to resume the project after the project has been rendered impossible to complete due to the decreasing.

4. The method of claim 3,
    where the resumption cost comprises at least one of a substitution cost and a time-delay cost,
    where the substitution cost is a function of a cost of substituting an available amount of a second resource to compensate for the reduction of the first, second, and third available amounts of the first resource,
    where the second resource is distinct from the first resource, and
    where the time-delay cost is a function of a duration of time required to perform the substituting.

5. The method of claim 4, where the substituting is constrained by a substitutability rule that specifies an amount of the second resource required to compensate for the decrease in the total available capacity of the first resource.

6. The method of claim 4, where the time-delay cost is a further function of a distance between a first geographic location of an instance of the first resource that is still available to the project and a second geographic location of an instance of the second resource that is available to the project.

7. The method of claim 1, where all or part of the set of dependency relationships is represented by a graph that represents a pair of instances of the set of instances of the first resource as a pair of nodes, and further represents a dependency relationship between the pair f instances as a directed path between the pair of nodes.

8. The method of claim 1, further comprising providing at least one support service for at least one of creating, integrating, hosting, maintaining, and deploying computer-readable program code in the computer system, where the computer-readable program code in combination with the computer system is configured to implement the identifying, the receiving, the determining, and the decreasing.

9. A computer program product, comprising a computer-readable hardware storage device having a computer-readable program code stored therein, the program code configured to be executed by a processor of a computer system to implement a method for compensating for reduced availability of a disrupted project resource,
    where a first resource comprises a set of instances of the first resource that are each associated with a corresponding available amount of the first resource that is made available by that instance,
    where a total available capacity of the first resource is a sum of available amounts of the first resource that are made available by all instances of the set of instances,
    where the project requires a first instance of the set of instances, a second instance of the set of instances, and a third instance of the set of instances,
    where the first instance identifies a first available amount of the first resource that is available to the project, where the second instance identifies a second available amount of the first resource that is available to the project, where the third instance identifies a third available amount of the first resource that is available to the project, and where a disruption of the first, second, or third instance results in a corresponding reduction of the first, second, or third available amount, the method comprising the processor identifying an initial value of the total available capacity as a sum of the first available amount, the second available amount, and the third available amount;

the processor receiving a set of dependency relationships, where a first dependency relationship of the set of dependency relationships identifies that an initial disruption of the first instance causes a second disruption of the second instance, and where a second dependency relationship of the set of dependency relationships identifies that the second disruption causes a disruption of the third instance;

the processor determining that the initial disruption:
  directly results in a reduction of the first available amount by a first-instance reduction amount,
  indirectly results, as a function of the first dependency relationship, in a reduction of the second available amount by a second-instance reduction amount and
  indirectly results, as a function of the second dependency relationship, in a reduction of the third available amount by a third-instance reduction amount; and the processor, as a result of the determining, decreasing the total available capacity of the first resource by a sum of the first-instance reduction amount, the second-instance reduction amount, and the third-instance reduction amount.

10. The computer program product of claim 9, further comprising the processor characterizing the first resource as being critical if the decreased total available capacity is less than a capacity threshold value.

11. The computer program product of claim 9, further comprising:
  the processor characterizing the first resource as being critical if a resumption cost exceeds a resumption-cost threshold value, where the resumption cost is a cost to resume the project after the project has been rendered impossible to complete due to the decreasing.

12. The computer program product of claim 11,
  where the resumption cost comprises at least one of a substitution cost and a time-delay cost,
  where the substitution cost is a function of a cost of substituting an available amount of a second resource to compensate for the reduction of the first, second, and third available amounts of the first resource,
  where the second resource is distinct from the first resource, and
  where the time-delay cost is a function of a duration of time required to perform the substituting.

13. The computer program product of claim 12, where the substituting is constrained by a substitutability rule that specifies an amount of the second resource required to compensate for the decrease in the total available capacity of the first resource.

14. The computer program product of claim 12, where the time-delay cost is a further function of a distance between a first geographic location of an instance of the first resource that is still available to the project and a second geographic location of an instance of the second resource that is available to the project.

15. A computer system comprising a processor, a memory coupled to the processor, and a computer-readable hardware storage device coupled to the processor, the storage device containing program code configured to be run by the processor via the memory to implement a method for compensating for reduced availability of a disrupted project resource, where a first resource comprises a set of instances of the first resource that are each associated with a corresponding available amount of the first resource that is made available by that instance, where a total available capacity of the first resource is a sum of available amounts of the first resource that are made available by all instances of the set of instances, where the project requires a first instance of the set of instances, a second instance of the set of instances, and a third instance of the set of instances, where the first instance identifies a first available amount of the first resource that is available to the project, where the second instance identifies a second available amount of the first resource that is available to the project, where the third instance identifies a third available amount of the first resource that is available to the project, and where a disruption of the first, second, or third instance results in a corresponding reduction of the first, second, or third available amount, the method comprising the processor identifying an initial value of the total available capacity as a sum of the first available amount, the second available amount, and the third available amount;

the processor receiving a set of dependency relationships, where a first dependency relationship of the set of dependency relationships identifies that an initial disruption of the first instance causes a second disruption of the second instance, and where a second dependency relationship of the set of dependency relationships identifies that the second disruption causes a disruption of the third instance;

the processor determining that the initial disruption:
  directly results in a reduction of the first available amount by a first-instance reduction amount,
  indirectly results, as a function of the first dependency relationship, in a reduction of the second available amount by a second-instance reduction amount and
  indirectly results, as a function of the second dependency relationship, in a reduction of the third available amount by a third-instance reduction amount; and the processor, as a result of the determining, decreasing the total available capacity of the first resource by a sum of the first-instance reduction amount, the second-instance reduction amount, and the third-instance reduction amount.

16. The computer system of claim 15, further comprising the processor characterizing the first resource as being critical if the decreased total available capacity is less than a capacity threshold value.

17. The computer system of claim 15, further comprising:
  the processor characterizing the first resource as being critical if a resumption cost exceeds a resumption-cost threshold value, where the resumption cost is a cost to resume the project after the project has been rendered impossible to complete due to the decreasing.

18. The computer system f claim 17,
where the resumption cost comprises at least one of a substitution cost and a time-delay cost,
where the substitution cost is a function of a cost of substituting an available amount of a second resource to compensate for the reduction of the first, second, and third available amounts of the first resource,
where the second resource is distinct from the first resource, and
where the time-delay cost is a function of a duration of time required to perform the substituting.

19. The computer system of claim 18, where the substituting is constrained by a substitutability rule that specifies an amount of the second resource required to compensate for the decrease in the total available capacity of the first resource.

20. The computer system of claim 18, where the time-delay cost is a further function of a distance between a first geographic location of an instance of the first resource that is still available to the project and a second geographic location of an instance of the second resource that is available to the project.

* * * * *